No. 828,467. PATENTED AUG. 14, 1906.
G. W. DURBROW.
FILTERING APPARATUS.
APPLICATION FILED OCT. 30, 1905.
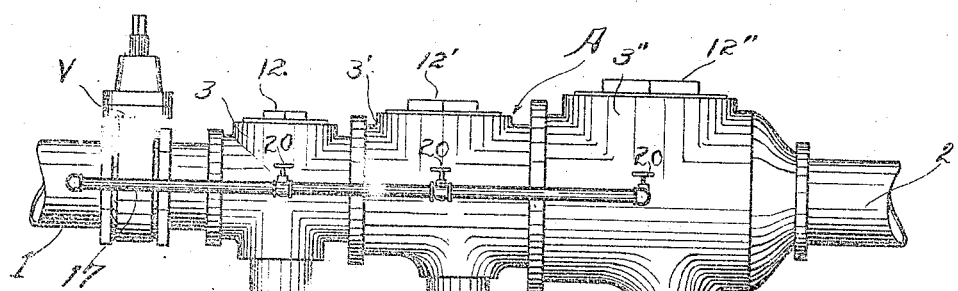
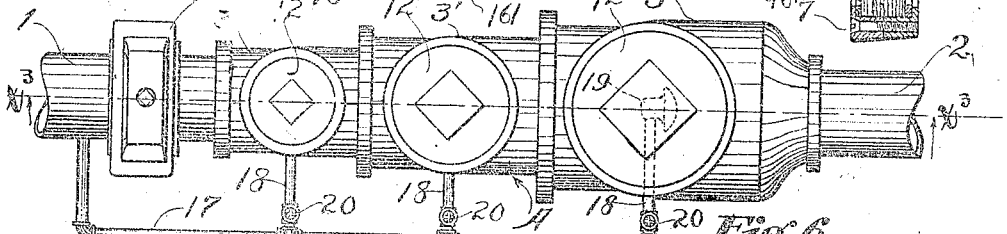
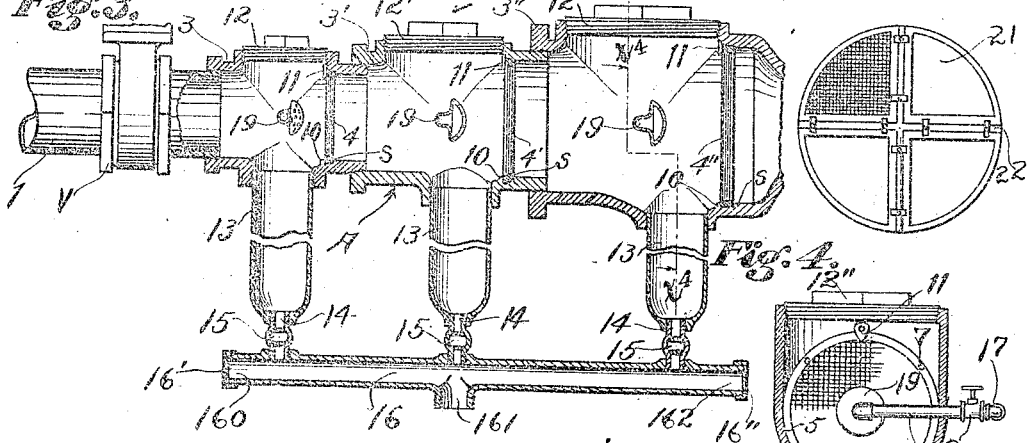
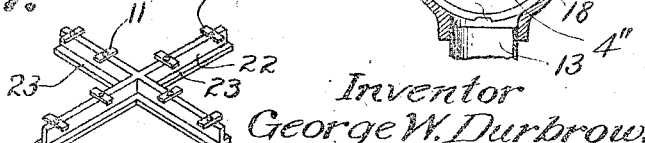
Witnesses:
Inventor
George W. Durbrow.
by James R. Townsend
his atty.

UNITED STATES PATENT OFFICE.

GEORGE W. DURBROW, OF INDIO, CALIFORNIA.

FILTERING APPARATUS.

No. 828,467. Specification of Letters Patent. Patented Aug. 14, 1906.

Application filed October 30, 1905. Serial No. 285,017.

*To all whom it may concern:*

Be it known that I, GEORGE W. DURBROW, a citizen of the United States, residing at Indio, in the county of Riverside and State of California, have invented a new and useful Filtering Apparatus, of which the following is a specification.

An object of this invention is to provide a filtering apparatus wherein the matter collected from the fluid filtered will not be retained in the filtering medium to so great an extent as in filters now in use, the sediment being instead deposited out of the path of the current of the liquid being filtered.

Another object is to provide means for quickly, conveniently, and thoroughly removing from the filtering material such of the foreign matter collected by filtering as is necessarily deposited thereon.

A further object is to provide filtering apparatus adapted to be applied to large water-mains, such as are used in a city's waterworks, as well as to smaller conduits.

Broadly considered, this invention comprises a main or other fluid-conduit, a filter therein, and a sediment-receptacle near the upstream side of the filter in position to receive the solids arrested by the filter.

More specifically, the invention includes a substantially horizontal elongated hollow body, a supply for one end thereof, and an outlet for the other end thereof, a plurality of filters within said body increasing progressively in size toward the downstream end thereof, sediment-receptacles near the upstream sides of the filters, and means for cleansing the filters and for flushing out the sediment-receptacles.

Referring to the accompanying drawings, which illustrate the invention, Figure 1 is a side elevation of the complete apparatus as it appears when applied to an ordinary horizontal water-main. Fig. 2 is a plan view thereof. Fig. 3 is a longitudinal vertical section on line $x^3 x^3$, Fig. 2, a portion of the supply and the valve for controlling the same being left unsectioned. In this figure the spraying-nozzle farthest toward the left is not sectioned and the upper portion of the main valve is broken away to contract the view. Fig. 4 is a vertical cross-section on line $x^4 x^4$, Fig. 3. In this figure the sediment-receptacle is broken away to contract the view. Fig. 5 is an enlarged vertical fragmental mid-section of one of the filters proper. Fig. 6 is a view showing a modified form of the filter proper mounted in a supporting-frame designed to be used when the apparatus is applied to water-mains requiring a filter several feet in diameter. Fig. 7 is a perspective of the supporting frame or spider shown in Fig. 6.

A designates an elongated hollow body provided at one end with a supply-pipe 1 and at the other end with a discharge-pipe 2, and V denotes a valve for regulating the supply of water to the body A through the supply pipe 1. Said hollow body A lies in substantially a horizontal direction and has an internal diameter increasing progressively from the supply end to the discharge end thereof and may be composed of a series of crosses 3, 3', and 3''. The horizontal arms of said crosses increase progressively in diameter from the smaller end to the larger end of the body A.

4 4' 4'' designate a series of filters located within the body A and increasing progressively in diameter from the smaller or inlet end of said body to the larger or outlet end thereof. Each of said filters is composed of rings 5 and 6, held together by screws 7, as shown in Fig. 5.

5' and 6' denote annular flanges, respectively, on the rings 5 and 6 for holding in place screens or perforated plates 8 8', between which is interposed any suitable filtering material 9.

On account of the filters increasing progressively in size toward the downstream end of the apparatus the current gradually slackens its speed, allowing more time for sediment to settle into the receptacles 13. Moreover, any sudden increase in the diameter of the hollow body in which the filters are mounted would cause an eddy or like agitation of the fluid, which would interfere with the proper settling of the sediment into receptacles 13. Hence if all the filters were as large as the largest filter 4'' a more cumbersome and expensive apparatus would result with little or no increase in the efficiency thereof. The filter illustrated in Fig. 5 is held in place within the hollow body A by being inserted therein through the openings, which are normally closed by caps 12 12' 12''.

S designates annular shoulder within the main to form an abutment against which the downstream side of the filter bears, said filters being held in place by lugs 10 on one side and buttons 11 on the other side thereof.

13 designates sediment-receptacles, one of which is located beneath the main near the upstream side of each filter in position to receive solids arrested by the filter and falling therefrom. Said receptacles 13 also receive the filth removed from the filter by washing the same in the manner hereinafter described. Each filtering-receptacle 13 is provided with an outlet-nipple 14, controlled by a valve 15. Said nipple communicates with a conduit 16, having three outlets 160 161 162. Two closures 16' 16" may be used to close the end of two of said outlets, leaving the third open.

Fluid-conducting means are provided independent of the main and communicating therewith on the upstream side of the valve V for supplying liquid to be used in washing the sediment off from the filters. Said means may include a pipe 17, having branches 18 leading into the hollow body A and terminating in spraying-nozzles 19, each of said nozzles being positioned to direct liquid against the face of a filter. 20 designates valves for controlling communication with spraying-nozzles 19.

When it is desired to clean the filters of any solid material which may have adhered to the face thereof, a stream is turned on through pipe 17, the main supply-valve V being closed and the valves 20 opened to supply water to the nozzles 19. At the same time the valves 15 are opened to allow the sediment to escape from sediment-receptacles 13, whereupon the current flows through nozzles 19 and is therefrom distributed over the face of each filter, freeing them from any accumulated sediment and discharging such sediment through the nipples 14 into the discharge-conduit 16.

In assembling the parts the caps 12 12' 12" are first removed, and each filter is inserted through the opening normally closed by the cap adjacent thereto, it being understood that each filter is made small enough to pass through the opening through which it is to be inserted.

In Figs. 6 and 7 I have shown a modified form of filter adapted to be used in the larger sizes of water-mains. In these views the filters proper are shown made in segments 21, fitting into the spider 22, which is constructed with arms of the proper length to enable the spider to fit against annular shoulder S in the same manner as the form of filter first described. The back side of the spider is furnished with flanges 23 and the front side with buttons 11'. The spider is first put in place in upright position within the main. The segmental filters are then placed between the arms of the spider and buttons 11' turned to hold said filters in place. The combined width of the spider and filters supported thereby should be such that lugs 10 and buttons 11 will hold the modified form of filter in place.

What I claim is—

1. In combination, a substantially horizontal main, a series of filters therein increasing progressively in size toward the downstream end thereof, a valve controlling the supply of fluid to said filters, a receptacle beneath each filter adjacent the upstream side thereof, a flushing-pipe with which each of said receptacles communicates, spraying means for said filters above said receptacles, and fluid-conducting means independent of the main and communicating therewith on the upstream side of said valve for supplying fluid to said spraying means.

2. In a filtering apparatus, in combination, a hollow body having an internal diameter increasing from one end toward the other, a supply being provided for the smaller end of said body and an outlet for the larger end thereof, a series of filters spaced longitudinally apart within said body, and a sediment-receptacle for each filter on the side thereof toward the supply.

3. In a filtering apparatus, in combination, an elongated hollow body having an internal diameter increasing from one end thereof toward the other, said body being provided with a supply leading into the smaller end thereof and an outlet leading from the larger end thereof and having at different points along the top thereof openings leading into the interior thereof, means for closing said openings, an annular seat being provided extending around the internal diameter of said body near the downstream side of each of said openings, a filter in each seat, said filter being adapted to be inserted through the opening adjacent said seat, and means for collecting sediment retained by said filters and retaining the same out of the path of the current.

4. In combination, a main, a series of filters therefor, means for retaining said filters in advance of each other in said main, said filters each constructed to filter the entire stream passing through said main, said filters increasing in size from one end of said main toward the other, a sediment-receptacle for collecting therebeneath the sediment arrested by each filter, spraying means for each filter, and flushing means communicating with each of said receptacles for discharging the sediment deposited by the whole series of filters.

5. In combination, a main, a series of filters therefor, means for retaining said filters in advance of each other in said main, said filters each constructed to filter the entire stream passing through said main, said filters increasing in size toward the downstream end of said main, a sediment-receptacle for each filter adjacent the upstream side thereof, spraying means above said receptacle adapted to spray the filter adjacent said receptacle, and means communicating with each of said receptacles for discharging the sediment.

6. In combination, a series of crosses having vertically and horizontally extending arms, said crosses connected together to form a horizontally-extending main, the horizontal arms of said crosses progressively increasing in internal diameter toward the downstream end of the main, a cap closing the top extension of each cross, a receptacle connected with the downward extension of each cross, a filter in the downstream extension of each cross, and a conduit adapted to convey sediment from said receptacles.

7. In combination, a substantially horizontal main, a plurality of filters in said main, said filters increasing in filtering area toward the downstream end of the main, and means out of the path of the current passing through the main for collecting sediment arrested by said filters.

8. In combination, a substantially horizontal main, a plurality of filters in said main, said filters increasing in filtering area toward the downstream end of the main, and settling-receptacles out of the path of the current passing through the main for collecting sediment arrested by said filters.

9. In a filtering apparatus, in combination, a substantially horizontal elongated hollow body having a supply at one end thereof and an outlet at the other end, a plurality of filters each of which is adapted to filter the entire stream passing through said body, said filters increasing progressively in size toward the downstream end of said body, a sediment-receptacle for each filter, and means for flushing said receptacles.

10. In combination, a substantially horizontal main, a plurality of filters therein increasing in filtering area toward the downstream end of the main, said filters having their upstream sides positioned to allow sediment to fall therefrom, and means for retaining the sediment out of the path of the current passing through the main.

11. In combination, a substantially horizontal main, a series of filters therein, a valve controlling the supply of fluid to said filters, a receptacle beneath each filter adjacent the upstream side thereof, a flushing-pipe with which each of said receptacles communicates, spraying means for said filters above said receptacles, and fluid-conducting means independent of the main and communicating therewith on the upstream side of said valve for supplying fluid to said spraying means.

12. In combination, a main, a series of filters therefor, means for retaining said filters in advance of each other in said main, said filters each constructed to filter the entire stream passing through said main, a sediment-receptacle for collecting therebeneath the sediment arrested by each filter, spraying means for each filter, and flushing means communicating with each of said receptacles for discharging the sediment deposited by the whole series of filters.

13. In combination, a main, a series of filters therefor, means for retaining said filters in advance of each other in said main, said filters each constructed to filter the entire stream passing through said main, a sediment-receptacle for each filter adjacent the upstream side thereof, spraying means above said receptacle adapted to spray the filter adjacent said receptacle, and means communicating with each of said receptacles for discharging the sediment.

In testimony whereof I have hereunto set my hand, at Los Angeles, California, this 24th day of October, 1905.

GEORGE W. DURBROW.

In presence of—
 ALBERT H. MERRILL,
 JULIA TOWNSEND.